(12) United States Patent
Wesson et al.

(10) Patent No.: US 12,399,065 B2
(45) Date of Patent: Aug. 26, 2025

(54) WIRELESS ENERGY-HARVESTING SENSOR PROBE UTILIZING BEAM STEERING FOR IN-OVEN POWER STEALING

(71) Applicants: TE Connectivity Nederland BV, s'Hertogenbosch (NL); Tyco Electronics (Shanghai) Co., Ltd., Shanghai (CN)

(72) Inventors: Robin Wesson, Middletown, PA (US); Shaoyong Wang, Shanghai (CN)

(73) Assignees: Tyco Electronics (Shanghai) Co., Ltd., Shanghai (CN); TE Connectivity Nederland BV, S-Hertogenbosch (NL)

( * ) Notice: Subject to any disclaimer, the term of this patent is extended or adjusted under 35 U.S.C. 154(b) by 519 days.

(21) Appl. No.: 17/701,029

(22) Filed: Mar. 22, 2022

(65) Prior Publication Data
US 2022/0299375 A1    Sep. 22, 2022

(30) Foreign Application Priority Data
Mar. 22, 2021  (EP) ..................... 21163968

(51) Int. Cl.
*G01K 1/024* (2021.01)
*H02J 50/00* (2016.01)
(Continued)

(52) U.S. Cl.
CPC ............ *G01K 1/024* (2013.01); *H02J 50/001* (2020.01); *H02J 50/20* (2016.02); *H02J 50/40* (2016.02); *G01K 2207/02* (2013.01)

(58) Field of Classification Search
CPC ...... G01K 2207/02; H02J 50/20; H02J 50/40; H02J 50/001
See application file for complete search history.

(56) References Cited

U.S. PATENT DOCUMENTS 4,377,733 A * 3/1983 Yamaguchi ............. G01K 1/14
374/149
2009/0188396 A1 7/2009 Hofmann et al.
(Continued)

FOREIGN PATENT DOCUMENTS

CN         111103068 A  *  5/2020
DE    102004047758 A1      4/2006
(Continued)

OTHER PUBLICATIONS

Translation of CN111103068A.*
(Continued)

*Primary Examiner* — Mirellys Jagan
(74) *Attorney, Agent, or Firm* — Barley Snyder

(57) ABSTRACT

A system for measuring a temperature of a food in an oven includes an energy emitting antenna positioned in the oven proximate an oven cavity and a battery-free sensor probe configured to be inserted into the food in the oven cavity. The energy emitting antenna sends a plurality of first signals at a same frequency that are phase shifted relative to each other. The battery-free sensor probe has a sensor probe antenna harvesting energy transmitted from the energy emitting antenna and transmitting a plurality of second signals back to the energy emitting antenna. The first signals are steered by the phase shifting to ensure that the first signals are received by the sensor probe antenna.

18 Claims, 3 Drawing Sheets

(51) Int. Cl.
H02J 50/20 (2016.01)
H02J 50/40 (2016.01)

(56) References Cited

U.S. PATENT DOCUMENTS

| | | | |
|---|---|---|---|
| 2016/0123818 A1 | 5/2016 | Van Rens | |
| 2019/0041271 A1* | 2/2019 | Preston | G01K 1/026 |
| 2019/0339133 A1* | 11/2019 | Pulvermacher | G01K 1/022 |
| 2020/0129006 A1* | 4/2020 | Nivala | G08B 21/24 |
| 2020/0182703 A1* | 6/2020 | Bourret | G01K 7/36 |
| 2021/0048347 A1* | 2/2021 | Sitaraman | G01K 1/024 |

FOREIGN PATENT DOCUMENTS

| | | |
|---|---|---|
| EP | 3779382 A1 | 8/2020 |
| IT | 201800003661 A1 | 9/2019 |
| WO | 2006034998 A1 | 4/2006 |
| WO | 2013001476 A1 | 1/2013 |

OTHER PUBLICATIONS

Extended European Search Report, Application No. 21163968.7-1001, Dated: Sep. 30, 2021, 9 pages.
Extended European Search Report, Application No. 20191043.7-1001, Dated: Jan. 13, 2021, 8 pages.

* cited by examiner

WIRELESS ENERGY-HARVESTING SENSOR PROBE UTILIZING BEAM STEERING FOR IN-OVEN POWER STEALING

CROSS-REFERENCE TO RELATED APPLICATIONS

This application claims the benefit of the filing date under 35 U.S.C. § 119(a)-(d) of European Patent Application No. 21163968.7, filed on Mar. 22, 2021.

FIELD OF THE INVENTION

The present invention is directed to a wireless sensor probe for monitoring temperature which utilizes beam steering for power stealing. In particular, the invention is directed to a wireless energy-harvesting sensor probe and system which utilizes beam steering for in-oven power stealing.

BACKGROUND

Proper handling and cooking of food, especially meats, is essential to avoiding contamination by disease-causing bacteria or pathogens. The United States Centers for Disease Control and Prevention (CDC) estimates that every year 48 million people get sick from a foodborne illness, 128,000 are hospitalized, and 3,000 die. The US Food and Drug Administration (USFDA) recommends using a thermometer to ensure that a minimum temperature of 140° F. to 165° F. is attained inside the meat during cooking.

Smart ovens communicate with temperature probes to enable energy-efficient regulation of temperature and prevent any risk of fire due to unattended over-heating of food. A wireless, battery-free meat probe eliminates the hassles of dealing with long wires and having to charge batteries, thereby improving usability and longevity of the product. However, in complex propagation environments, such as inside an oven cavity, many reflections and refractions combine to create a pattern of 'hotspots' where the field strength is relatively high and deep and 'cold spots' where nearly no signal exists, making communications with a wireless, battery-free meat probe difficult.

SUMMARY

A system for measuring a temperature of a food in an oven includes an energy emitting antenna positioned in the oven proximate an oven cavity and a battery-free sensor probe configured to be inserted into the food in the oven cavity. The energy emitting antenna sends a plurality of first signals at a same frequency that are phase shifted relative to each other. The battery-free sensor probe has a sensor probe antenna harvesting energy transmitted from the energy emitting antenna and transmitting a plurality of second signals back to the energy emitting antenna. The first signals are steered by the phase shifting to ensure that the first signals are received by the sensor probe antenna.

BRIEF DESCRIPTION OF THE DRAWINGS

The invention will now be described by way of example with reference to the accompanying Figures, of which.

DETAILED DESCRIPTION OF THE EMBODIMENTS

Figure 1:
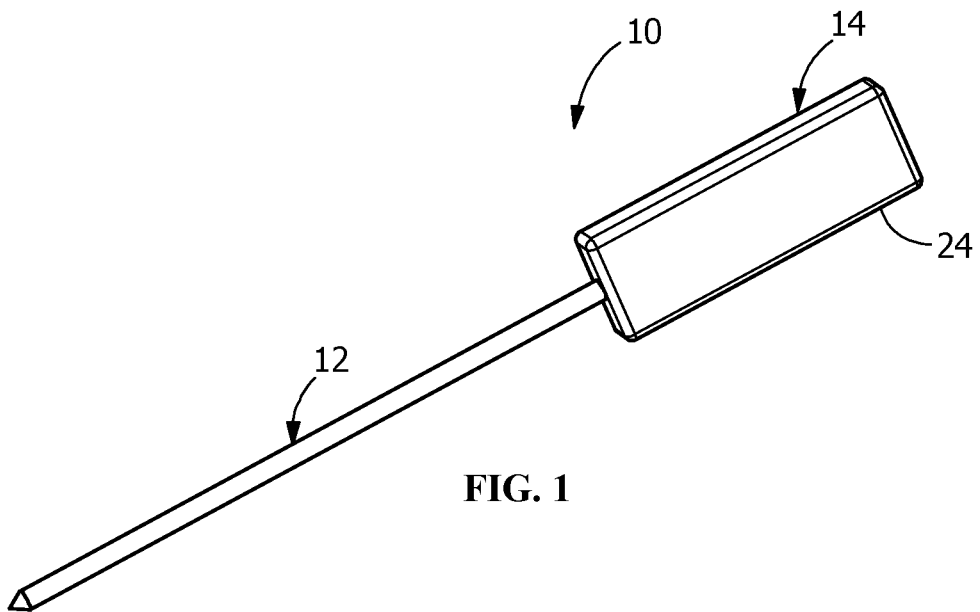
FIG. 1 is a perspective view of a sensor probe according to the invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the embodiments. Accordingly, the invention expressly should not be limited to such embodiments illustrating some possible non-limiting combination of features that may exist alone or in other combinations of features, the scope of the invention being defined by the claims appended hereto. Features and advantages of the present invention will be apparent from the following more detailed description of the embodiments, taken in conjunction with the accompanying drawings which illustrate, by way of example, the principles of the invention.

Figure 2:
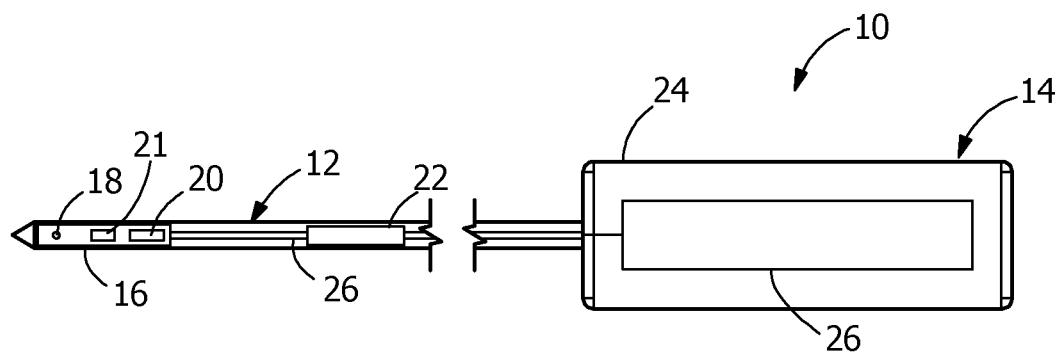
FIG. 2 is a diagrammatic top view of the sensor probe.

As shown in FIGS. 1 and 2, a sensor probe 10 according to the invention has a needle or probe portion 12 and a handle 14. The needle or probe portion 12 is configured to be inserted or partially inserted into a substance or material, such as, but not limited to meat. The handle 14 is configured to be positioned outside or partially outside of the substance or material.

The probe portion 12, as shown in FIG. 2, houses a circuit board 16 with a processor or microcontroller. In the illustrative embodiment shown, the circuit board 16 includes a temperature sensor 18, a radio frequency (RF) transmitter/receiver 20 and a power stealing regulator 21. However, in other embodiments, the temperature sensor 18, the RF transmitter/receiver 20 and the power stealing regulator 21 may be separate components which are electrically connected to the circuit board 16, the circuit board 16 does not have a microcontroller, any combination of the circuit board 16, the temperature sensor 18, the RF transmitter/receiver 20, or other sensors may be housed in one component, and/or sensors in addition to, or other than, the temperature sensor 18 may be provided, for example, but not limited to a humidity sensor. In alternate embodiments, more than one temperature sensor 18 may be provide at different locations along the length of the probe portion 12 to allow the temperature of the food to be measured at different locations.

In the embodiment shown in FIG. 2, a terminal isolation device 22 is provided in the probe portion 12. The terminal isolation device 22 may be, but is not limited to, a capacitor or other type of thermal insulator.

The handle 14 includes a housing 24 and a sensor probe antenna 26. The sensor probe antenna 26 may have a planar configuration, as shown in FIG. 2. Alternatively, the antenna 26 may have other configurations, such as, but not limited to: dipole or monopole.

Figure 3:
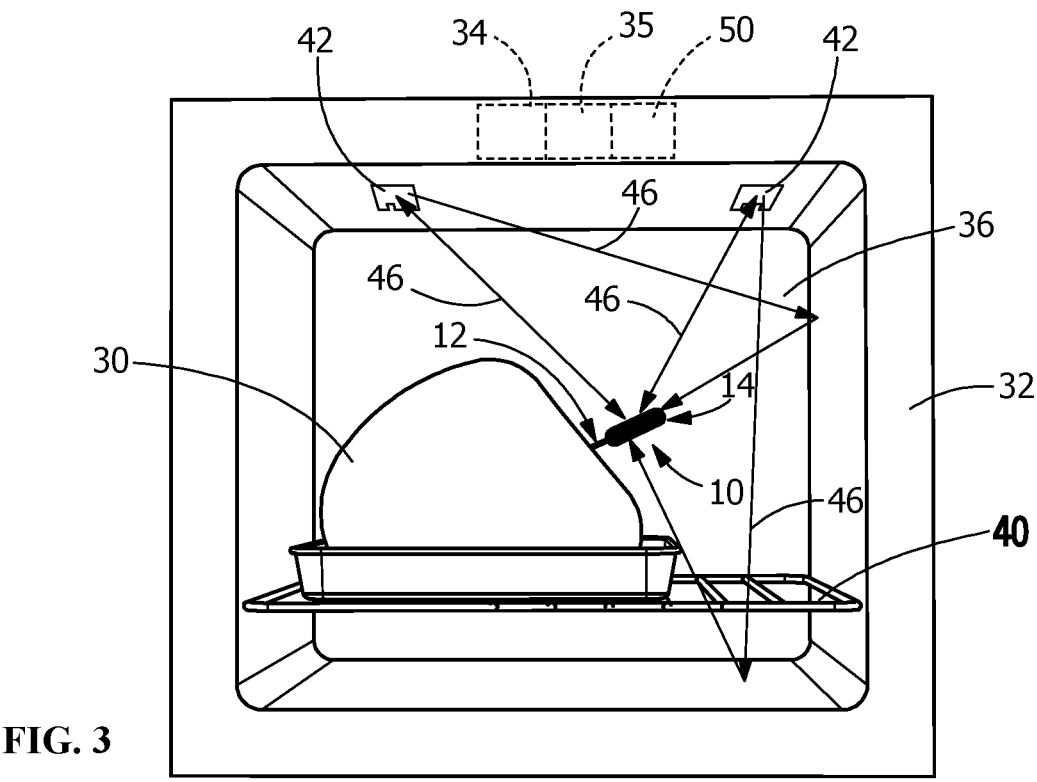
FIG. 3 is a diagrammatic view of the sensor probe in a food item in an oven with two antennas.
Figure 4:
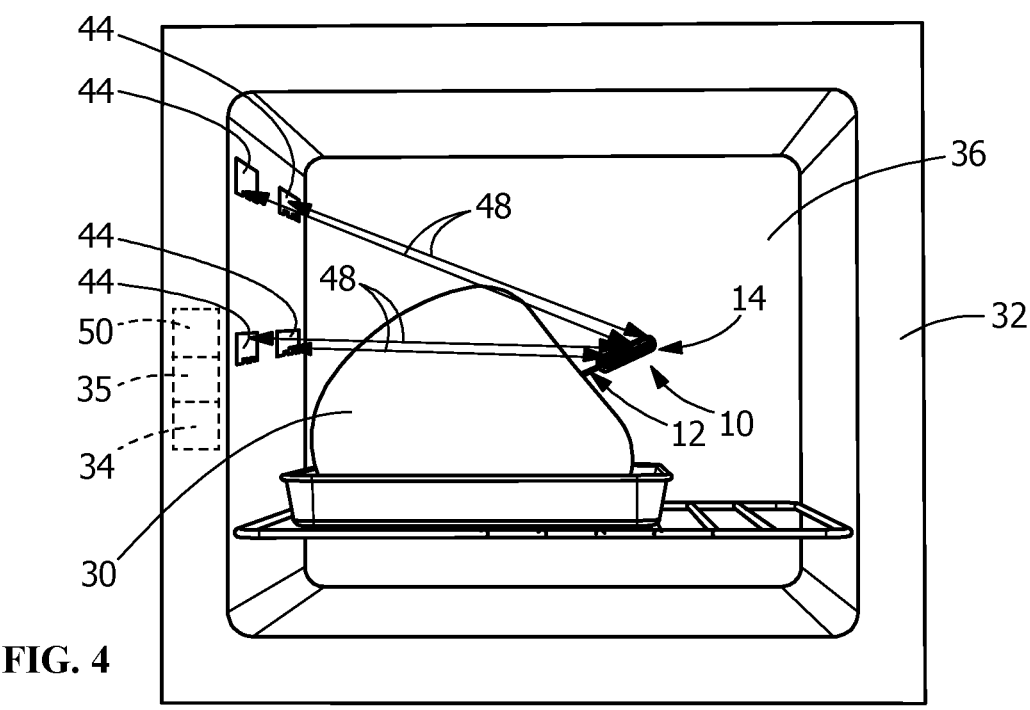
FIG. 4 is a diagrammatic view of the sensor probe in a food item in an oven with four antennas.

When in use, as shown in FIGS. 3 and 4, the sensor or meat probe 10 is positioned in the food or meat 30 in an oven 32. The oven 32 has an RF power transmitter 34 positioned proximate an oven cavity or compartment 36. The oven 32 has an RF data receiver/transceiver 35 positioned proximate the oven cavity or compartment 36. The RF power transmitter 34 and the RF data receiver/transceiver 35 are connected to one or more antennas 42 (FIG. 3), 44 (FIG. 4).

One of the key challenges for a sensor or meat probe 10 is the high temperature of operation inside an oven 32 or the like. Aside from using high-temperature-rated materials, the circuit board 16 and other electronics need to be protected from the high heat. Most semiconductor chips are only rated to operational temperatures of 85° C. or 125° C. As the temperature in the oven compartment 36 is often in excess of 125° C., any electronics located in a reasonably-sized handle 14 cannot be practically retained under 125° C. for 3 hours. As the best insulator inside the oven 32 is the food 30 itself, the circuit board 16 and other electronics is positioned in the needle or probe portion 12 when in use, thereby protecting or insulating the needle or probe portion 12 by the food 30.

In order to use the probe 10, the probe 10 requires energy for operation. As the probe 10 does not contain batteries, the probe 10 must use energy harvesting for operation. The battery-free meat probe 10 requires a mechanism to harvest enough energy to power the circuit board 16, temperature sensor 18, and the RF transmitter/receiver 20. The RF transmitter/receiver 20 has a unique electronic identification which is distinguishable from other similar devices.

While an obvious source of energy inside an oven compartment 36 is the heat, the probe 10 must be operational even when the oven 32 is just beginning to warm-up. In this phase, there is not enough temperature gradient to harvest the required power required for the electronics. Consequently, as shown in FIGS. 3 and 4, RF energy harvesting using a dedicated RF power transmitter 34 in the oven 32 is used. As the communication between the RF transmitter/receivers 20 and the power stealing regulators 21 of the probe 10 and the power transmitter 34 and the RF data receiver/transceiver 35 is wireless, the energy in the wireless signal sent from the power transmitter 34 to power stealing regulators 21 of the probe 10 is re-purposed, to allow the probe 10 to operate and respond.

In the embodiment shown, the system includes the RF power transmitter 34 and the RF data receiver/transceiver 35 positioned in a wall or other position of the oven 32. The oven 32, the power transmitter 34 and the RF data receiver/transceiver 35 are a fixed system, without size restrictions, and are powered by AC current or one or more large batteries. The one or more RF transmitter/receivers 20 and power stealing regulators 21 of the probe 10 are smaller, portable, and battery-free systems. The RF transmitter/receivers 20 and the power stealing regulators 21 are connected to one or more antennas 26, shown in FIG. 2. The system supports communication range of up to approximately one meter using high-power RF power transmitters 34 and RF data receiver/transceivers 35. The RF data receiver/transceivers 35 can detect multiple RF transmitter/receivers 20 in the vicinity which is beneficial for large ovens where many pieces of food are cooked simultaneously.

Alternatively, the oven rack 40 may include the RF power transmitter 34 and the RF data receiver/transceiver 35, thereby allowing for close proximity of the sensor probe 10 to the RF power transmitter 34 and the RF data receiver/transceiver 35 regardless of the position of the food 30 in the oven cavity or compartment 36. The oven rack 40 may be positioned in the oven 32 with or without electrical isolation. In another alternate embodiment, the rack 40 may act as a signal enhancer or antenna to facilitate communication with the RF power transmitter 34 and the RF data receiver/transceiver 35 located at another location. In other alternate embodiments, the RF power transmitter 34 and the RF data receiver/transceiver 35 may be located in one, two, three, four or five walls of the oven cavity or compartment 36 and/or on the door of the oven and/or at any arbitrary position inside the cavity or compartment 36. The RF power transmitter 34 may be configurable to radiate in various patterns.

In the illustrative embodiment shown, the circuit board 16 has a width of approximately 2.6 mm and length of approximately 20 mm. The smallest trace width and space used for routing is 100 μm, and only two metal layers were used for routing all the components on the circuit board 16. The choice of trace width and number of layers is governed by two factors: ensuring routability of all the components and minimizing manufacturing cost of the circuit board 16. However, other circuit boards 16 with other dimensions and other configurations may be used.

In the illustrative embodiment shown, the circuit board 16 is fabricated from high-temperature circuit board material with a glass transition temperature of greater than 280° C. and thermal degradation temperature of 390° C., such as Rogers 4350. The outside housing 24 of the probe portion 12 is made from stainless steel or other material which conducts heat. The handle 14 material is Polytetrafluoroethylene (PTFE).

All the materials that are outside the food 30 during operation are chosen to withstand 300° C. In contrast, the circuit board 16 and other electronics have a maximum recommended operational temperature of 85° C., as the electronics will not be subject to more than 74° C. (165° F.) during normal operation. However, the use of a high-temperature material for the circuit board 16 allows the circuit board 16 to survive accidental exposures to 300° C.

As the stainless-steel probe portion 12 is small and blocks RF signals, the antenna 26 must be housed in the handle 14, and be capable of surviving 300° C. In one illustrative embodiment, the antenna 26 has a dimension of approximately 60 mm×16 mm. However, other sizes and configurations of the antennas may be used. The dimensions and configurations of the antenna 26 are optimized to allow the probe 10 to be positioned in the oven compartment 36 at any orientation, allowing proper communication with the RF power transmitter 34 and the RF data receiver/transceiver 35.

The antenna 26 is made from metal or other conductive material and is exposed to high temperatures in the oven compartment 36. In contrast, the circuit board 16 is not rated to be operated at high temperatures for long periods of time. Consequently, in order to prevent heat from being conducted through the antenna 26 to the circuit board 16, the thermal isolation device 22 is provided in line with the antenna 26 proximate the circuit board 16. The thermal isolation device 22 is provided to dissipate the heat collected and transmitted by the antenna 26, thereby preventing harmful heat from reaching the circuit board 16, the RF transmitter/receiver 20 and the power stealing regulator 21. The thermal isolation device 22 does not adversely affect the electrical communication between the antenna 26 and the circuit board 16, the RF transmitter/receiver 20 and the power stealing regulator 21.

In complex propagation environments, such as inside an oven cavity or compartment 36, many reflections and refractions combine to create a pattern of 'hotspots' where the field strength is relatively high and deep 'cold spots' where nearly no field intensity exists. Powering an electronic circuit of the sensor or meat probe 10 'over the air' in such an environment can be much more complex than in an open space. The illustrative embodiments of FIGS. 3 and 4 illustrate systems of multiple energy emitting antenna 42 (FIG. 3) and 44 (FIG. 4) which are connected to the power transmitter 34. In alternate embodiments, one antenna may be provided with different operation frequency bands. The antenna 42, 44 may work at the same frequency but can be phase controlled or shifted with respect to each other to steer the energy emission in a manner which optimally targets, with maximum link efficiency, the power stealing regulator 21 of the probe 10, as represented by beams or arrows 46 (FIG. 3) and 48 (FIG. 4). In an enclosed environment, such as the oven cavity 36, the beams 46, 48 manifest as patterns of high and low intensity. Changing the phase relationships between emitters modifies the three-dimensional pattern of signal intensity in the oven 32. Steering the energy from the power transmitter 34 in the oven 32 to couple power effectively to the power stealing regulator 21 is highly desirable to mitigate the situation where the power stealing regulator 21 is invisible to a fixed antenna 42, 44 system due to multipath. Similarly, steering the signal transmissions between the RF data receiver/transceiver 35 positioned proximate an oven cavity or compartment 36 and the RF transmitter/receiver 20 in the probe 10 is highly desirable to mitigate the situation where the RF transmitter/receiver 20 is invisible to a fixed antenna 42, 44 system due to multipath.

The oven 32 can be considered as a sub-optimal form of cavity filter, which has highly complex and sharp frequency responses. The RF or inductive fields are impacted in complex ways by the metal work inside the oven compartment or cavity 36. Other propagation environments with high reflections near the reader and or tag antenna in an energy harvesting system will face similar challenges.

As well as helping to ensure the power stealing regulator 21 and RF transmitter/receiver 20 are not in a multipath null field location, beam steering array systems have gain. A two element or energy emitting antenna 42 array, as shown in FIG. 3, can place four times as much energy or power at the location of the power stealing regulator 21 and the RF transmitter/receiver 20, assuming each energy emitting antenna 42 transmits the same power, providing a 6 dB link power advantage. A four element or energy emitting antenna 44 array, as shown in FIG. 4, can put 16× energy or power at the location of the power stealing regulator 21 and the RF transmitter/receiver 20, providing a 12 dB link power advantage. As energy coupling is a primary goal of energy harvesting systems, these are significant advantages in terms of range or speed of activation. Alternatively, for a given range, the overall transmitted power is lower in an antenna array-based energy harvesting system, improving emissions and interference with other systems and improving efficiency of operation.

Steering a beam for optimum power transfer to the power stealing regulator 21 and the RF transmitter/receiver 20 can be facilitated by measurement systems known as reflectometers 50, shown in FIGS. 3 and 4. The circuits or reflectometers 50 are used to measure when power transmitted to the energy emitting antenna 42, 44 is reflected back. In the extreme case, a fully enclosed oven 32 with only a power harvesting system inside it can be considered as a cavity filter with one input and one output. Adapting or tuning the energy emitting antenna steering parameters is therefore possible by measuring forward and reflected power on all of the reader or energy emitting antenna elements and maximizing for lowest overall reflected power. In an empty cavity with no other significant power losses present the reader can calculate and thereby optimize the power absorption of the power stealing regulator 21 and the RF transmitter/receiver 20.

In practical implementations, the oven 32 will have other losses including heating of the food 30 by electromagnetic dielectric heating and loss through the oven door. Careful design of the door and selection of the frequency of operation can optimize for antenna 42, 44 size, energy loss from the closed system and manage the relative energy absorption by any food 30 and by the power stealing regulator 21 and the RF transmitter/receiver 20.

In various illustrative embodiments, the beam 46, 48 can be swept in a search pattern until the power stealing regulator 21 is first initialized or activated. A feedback loop can be set up to inform the reader or oven 32 about the quality of the coupling between the multiple energy emitting antenna 42, 44 and the RF transmitter/receiver 20. This allows for an ongoing and real time optimization driven by algorithms and the feedback from the RF transmitter/receiver 20. This also allows the transmitter 34 power to be reduced, improving the systems efficiency. Reducing the power radiated in other directions is also a health and safety consideration, as well as an efficiency advantage in the case of higher power energy systems.

Figure 5:
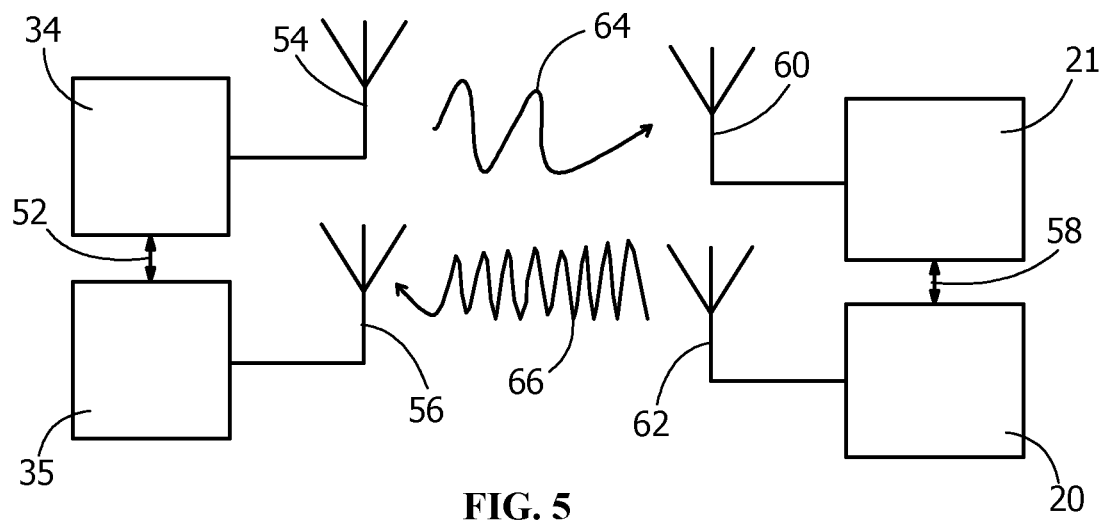
FIG. 5 is a diagrammatic view of a dual band power stealing and data link that can be used in an oven.

Referring to FIG. 5, a diagrammatic view of a system with one power transmitter 34 and one RF data receiver/transceiver 35 is shown. In this embodiment, the power transmitter 34 and the RF data receiver/transceiver 35 are in electrical communication as represented by arrow 52. The power transmitter 34 has an antenna 54 and the RF data receiver/transceiver 35 has an antenna 56. However, in other embodiments, the power transmitter 34 and the RF data receiver/transceiver 35 may share an antenna.

The probe 10 includes one the power stealing regulator 21 and one RF transmitter/receiver 20, as shown in FIG. 5. The power stealing regulator 21 and the RF transmitter/receiver 20 are in electrical communication as represented by arrow 58. The power stealing regulator 21 has an antenna 60 and the RF transmitter/receiver 20 has an antenna 62. However, in other embodiments, the power stealing regulator 21 and one RF transmitter/receiver 20 may share an antenna.

In use, the power transmitter 34 transmits energy in the form of RF signals to the power stealing regulator 21 as represented by arrow 64. The transmission allows power to be supplied to the power stealing regulator 21 and the probe 10 to initially power the probe 10 and maintain operation of the probe 10. Once powered, communication between the RF data receiver/transceiver 35 and the RF transmitter/receiver 20 is done wirelessly, as represented by arrow 66.

Figure 6:
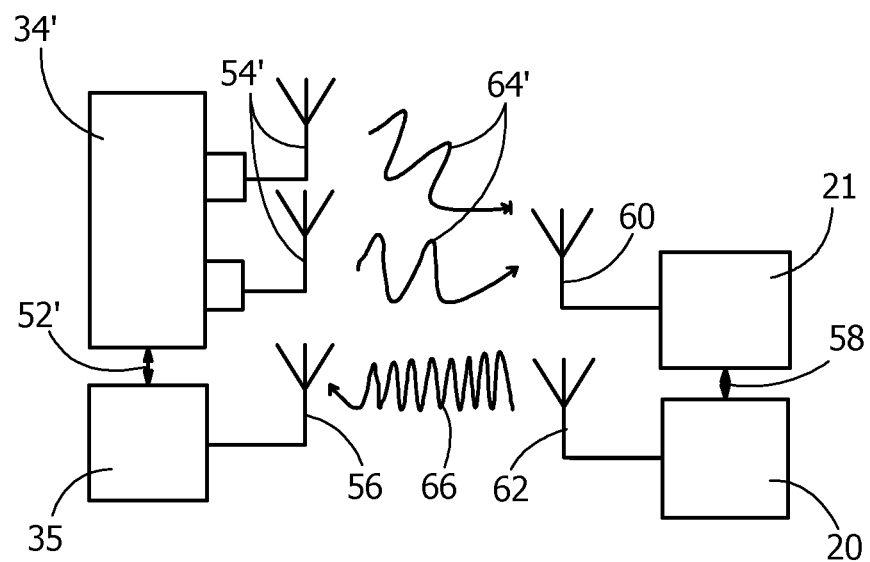
FIG. 6 is a diagrammatic view of a dual band power stealing and data link with a phase adjusting power transmitter that can be used in an oven.

Referring to FIG. 6, a diagrammatic view of a power transmitter 34' and one RF data receiver/transceiver 35 is shown. In this embodiment, the power transmitter 34' is an n-channel phase adjusting power transmitter. The power transmitter 34' and the RF data receiver/transceiver 35 are in electrical communication as represented by arrow 52'. The power transmitter 34 has multiple antennas 54' and the RF data receiver/transceiver 35 has an antenna 56. However, in other embodiments, the power transmitter 34' and the RF data receiver/transceiver 35 may share an antenna.

The probe 10 includes one the power stealing regulator 21 and one RF transmitter/receiver 20, as shown in FIG. 6. The power stealing regulator 21 and the RF transmitter/receiver 20 are in electrical communication as represented by arrow 58. The power stealing regulator 21 has an antenna 60 and the RF transmitter/receiver 20 has an antenna 62. However, in other embodiments, the power stealing regulator 21 and one RF transmitter/receiver 20 may share an antenna.

In use, the power transmitter 34' transmits energy in the form of RF signals over multiple paths to the power stealing regulator 21 as represented by arrows 64'. The transmission allows power to be supplied to the power stealing regulator 21 and the probe 10 to initially power the probe 10 and maintain operation of the probe 10. Once powered, communication between the RF data receiver/transceiver 35 and the RF transmitter/receiver 20 is done wirelessly, as represented by arrow 66.

The embodiments shown and described herein are directed to a sensor probe 10 which is wireless and does not need batteries, thereby allowing the needle 12 of the sensor probe 10 to have a small diameter. In addition, as no batteries are required, the life of the probe 10 is not limited by battery life and safety concerns of placing batteries in an oven proximate food are eliminated. The probe 10 is a low-cost NFC-based wireless battery-free solution for use with smart ovens.

The wireless communication of the probe 10 with the oven 32 allows the oven temperature to be regulated based on the actual internal food temperature readings from the probe 10 and not the oven ambient temperature. The power harvested can be used to power a separate electronic subsystem which can include a wireless data link operating independently. Alternatively, the same antenna or another communication antenna with different operation frequency band used to collect power can be used to transmit signals back to the energy emitting antennas.

The underlying beam-steering wireless energy transfer concept will have advantages in other complex propagation environments and also in simple environments where there is a requirement to minimize overall transmitted power while ensuring link robustness or optimizing transfer efficiency. Examples might include communication with a sensor in a non-contact application in industrial systems where access for replacing a battery can be expensive.

One skilled in the art will appreciate that the invention may be used with many modifications of frequency band, antenna type and number, structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A system for measuring a temperature of a food in an oven, comprising:
an energy emitting antenna positioned in the oven proximate an oven cavity, the energy emitting antenna sending a plurality of first signals at a same frequency that are phase shifted relative to each other;
a battery-free sensor probe configured to be inserted into the food in the oven cavity, the battery-free sensor probe having a sensor probe antenna harvesting energy transmitted by the first signals from the energy emitting antenna and transmitting a plurality of second signals back to the energy emitting antenna, the first signals being steered by the phase shifting to ensure that the first signals are received by the sensor probe antenna, and the sensor probe antenna having a power stealing regulator; and
a feedback loop measuring a quality of a coupling between the energy emitting antenna and the power stealing regulator.

2. The system of claim 1, wherein the energy emitting antenna is positioned in a wall of the oven cavity.

3. The system of claim 1, wherein the second signals are transmitted on a different operation frequency band than the first signals.

4. The system of claim 1, wherein the energy emitting antenna has a power transmitter and a data receiver or transceiver.

5. The system of claim 4, wherein the power transmitter is an n-channel phase adjusting power transmitter.

6. The system of claim 5, wherein the sensor probe antenna has a data transmitter or receiver.

7. The system of claim 6, wherein the energy emitting antenna has a plurality of reflectometers measuring forward and reflected energy emitted from the energy emitting antenna.

8. The system of claim 6, wherein the energy emitting antenna sends the first signals in a search pattern to activate the power stealing regulator.

9. The system of claim 6, wherein the energy emitting antenna is one of a pair of energy emitting antennas spaced from each other.

10. The system of claim 6, wherein the energy emitting antenna is one of four energy emitting antennas spaced from each other.

11. A system for measuring a temperature of a food in an oven, comprising:
a plurality of energy emitting antennas positioned in the oven proximate an oven cavity, the energy emitting antennas each having a power transmitter and a data receiver or transceiver, the energy emitting antennas sending a plurality of first signals at a same frequency that are phase shifted relative to each other;
a battery-free sensor probe configured to be inserted into the food in the oven cavity, the battery-free sensor probe having a sensor probe antenna with a power stealing regulator and a data transmitter or data transceiver to harvest energy transmitted by the first signals from the energy emitting antennas and transmit a plurality of second signals back to the energy emitting antennas, the first signals are being steered by the phase shifting to ensure that the first signals are received by the sensor probe antenna; and
a feedback loop measuring a quality of a coupling between each of the energy emitting antennas and the power stealing regulator.

12. The system of claim 11, wherein the energy emitting antennas each have a plurality of reflectometers measuring forward and reflected energy emitted from the energy emitting antennas.

13. The system of claim 11, wherein the energy emitting antennas each send the first signals in a search pattern to activate the power stealing regulator.

14. The system of claim 11, wherein the energy emitting antennas are two energy emitting antennas spaced from each other.

15. The system of claim 11, wherein the energy emitting antennas are four energy emitting antennas spaced from each other.

16. The system of claim 11, wherein the energy emitting antennas are positioned in a wall of the oven cavity.

17. The system of claim 16, wherein the power transmitter is an n-channel phase adjusting power transmitter.

18. A system for measuring a temperature of a food in an oven, comprising:

a plurality of energy emitting antennas positioned in the oven proximate an oven cavity, the energy emitting antennas each having a power transmitter and a data receiver or transceiver, the energy emitting antennas sending a plurality of first signals at a same frequency that are phase shifted relative to each other;

a battery-free sensor probe configured to be inserted into the food in the oven cavity, the battery-free sensor probe having a sensor probe antenna with a power stealing regulator and a data transmitter or data transceiver to harvest energy transmitted by the first signals from the energy emitting antennas and transmit a plurality of second signals back to the energy emitting antennas, the energy emitting antennas each sending the first signals in a search pattern to activate the power stealing regulator; and a feedback loop measuring a quality of a coupling between each of the energy emitting antennas and the power stealing regulator.

\* \* \* \* \*